(No Model.) 2 Sheets—Sheet 2.

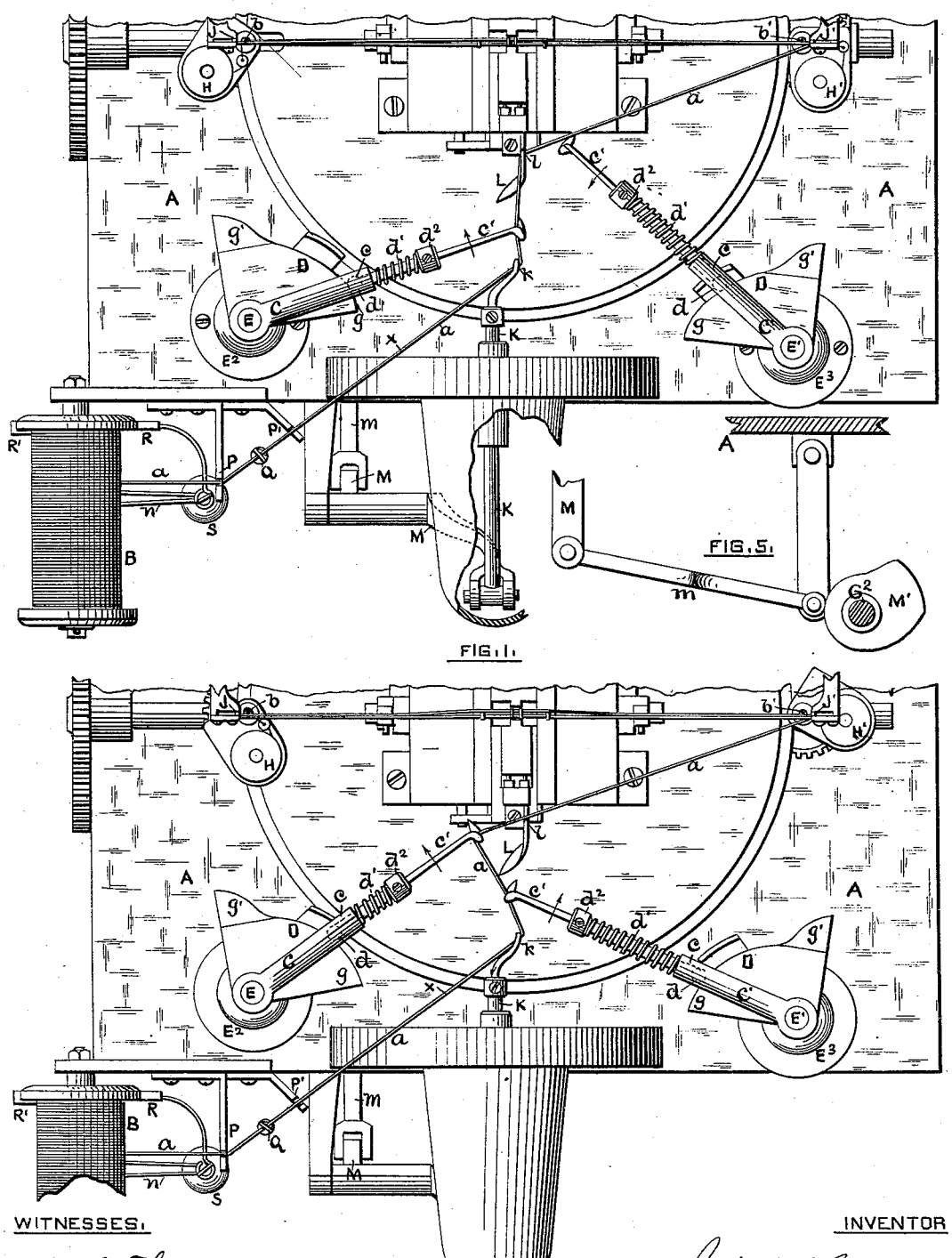

J. H. CROWELL.
MACHINE FOR MAKING WEAVERS' HARNESS.

No. 253,848. Patented Feb. 21, 1882.

WITNESSES.
W. H. Thurston.
J. Knight.

INVENTOR.
John H. Crowell

UNITED STATES PATENT OFFICE.

JOHN H. CROWELL, OF PROVIDENCE, RHODE ISLAND, ASSIGNOR TO THE KENDRICK LOOM HARNESS COMPANY, OF SAME PLACE.

MACHINE FOR MAKING WEAVERS' HARNESS.

SPECIFICATION forming part of Letters Patent No. 253,848, dated February 21, 1882.

Application filed May 20, 1881. (No model.)

*To all whom it may concern:*

Be it known that I, JOHN H. CROWELL, of the city and county of Providence, and State of Rhode Island, have invented a new and useful Improvement in Machines for Making Weavers' Harness; and I do hereby declare that the following specification, taken in connection with the accompanying drawings, forming a part of the same, is a full, clear, and exact description thereof.

My invention relates to machines for making weavers' harness; and it consists in certain combinations of devices whereby the heddles can be formed from one continuous twine, instead of from two separate twines looped together.

The harness manufactured by my machine is suitable for use, when mounted upon proper shafts, in an ordinary loom for weaving fabrics; but it is especially intended to be separated, after it is manufactured into the individual heddles composing it, for use in Jacquard looms. The harness consists of a single twine laid in continuous folds, returned upon itself, and knitted to the back-bands at the end of each fold, with a crochet-stitch or suitable binding-thread. The two legs of each of the individual heddles composing the harness are connected by metal clasps, which define the length of the heddle-eye and secure the two adjacent lengths of twine together. A description of such a harness and the method of separating it into individual heddles will be found in Letters Patent of the United States No. 244,982, granted to me August 2, 1881.

The drawings represent only so much of the machine as is necessary for the full understanding of my improvement. Much of the mechanism which is employed, and all that is not fully represented, is already known to the art, and is familiar to constructors of this class of machinery.

Figure 3:
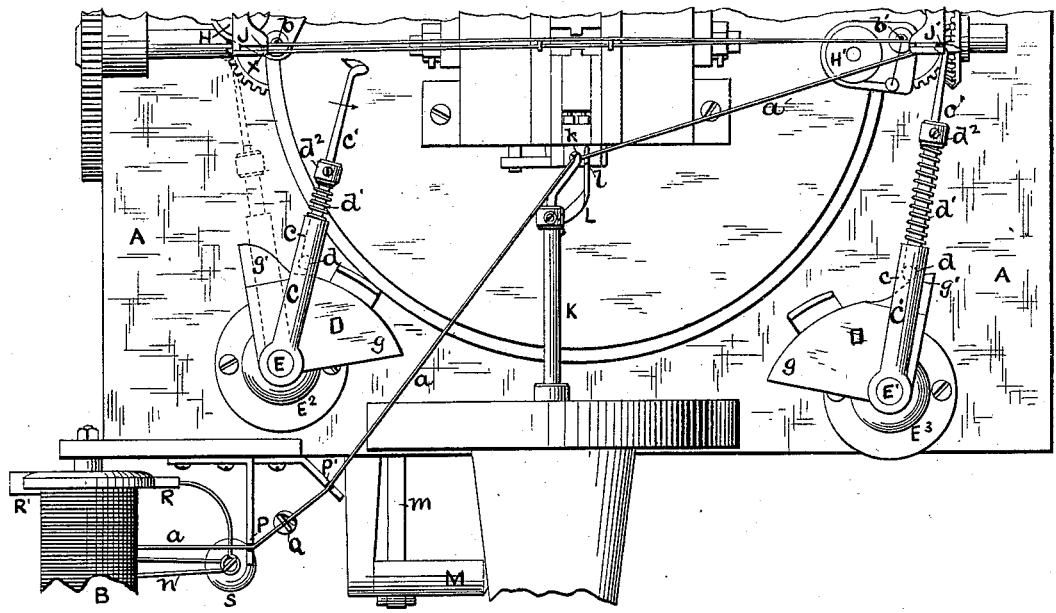
Figure 4:
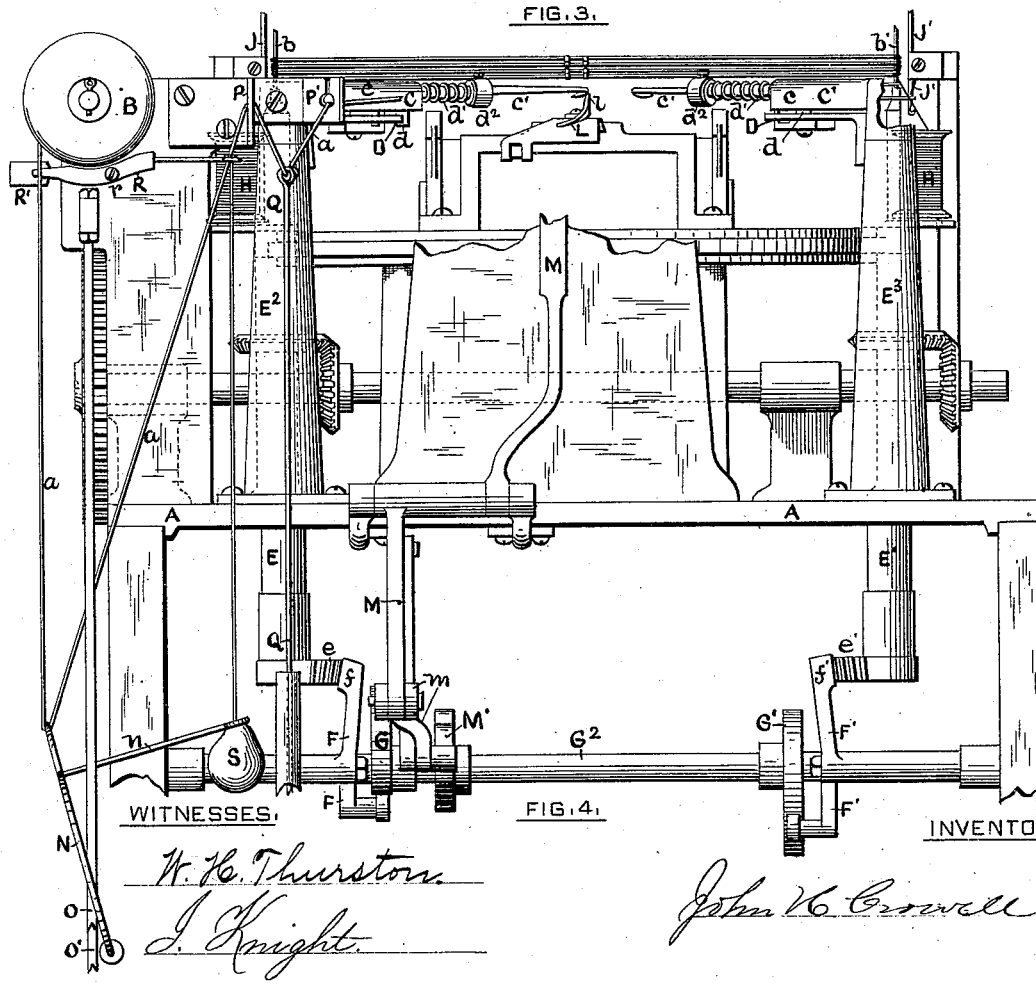

Figures 1, 2, and 3 are respectively plan views, showing different positions of the vibrating hooked arms, which carry the twine in proper folds to the back-bands, to which the heddles are knitted. Fig. 4 shows a front view of the machine. Fig. 5 represents certain parts of the machine in detail.

Referring to the drawings, A is the platform or bed of the machine, which is mounted on a suitable frame.

B represents a bobbin of harness-twine, which is set upon a stud-pin, so that it can revolve and give off the twine as required by the machine in its action. In order to start the machine it is to be supposed that a sufficient length of twine, $a$, has been led by the operator from the bobbin B in the path indicated in Figs. 1 and 4, and the end of said twine tied to the back-band $b'$.

C C' represent two vibrating arms of peculiar construction, the offices of which are to lay hold of the twine by means of their hooked ends, and carry the same out to the back-bands in such a manner that the twine will be returned upon itself from back-band to back-band in a continuous fold. Each of these vibrating arms is composed of a sleeve portion, $c$, of a definite length, and a member, $c'$, which is capable of sliding longitudinally in the hollow axis of the sleeve portion $c$, and is furnished with a hook end. By means of this telescopic-joint connection of the two members composing each vibrating arm C C' the length of such arms, as a whole, can be varied in order to meet certain requirements in the performance of their offices, presently to be explained.

The means by which the length of the vibrating arms C C' can be respectively varied consist of a pin, $d$, which projects at right angles from the shank of the hook member $c'$, and passes through a longitudinal slot cut through the under side of the sleeve portion $c$, as indicated by dotted lines in Figs. 1, 2, and 3, and in elevation at Fig. 4. This pin $d$ during the vibration of its arm rides over the face of the stationary cam D. (Shown in the several figures.) Such cam-face, in conjunction with the contractile spring $d'$, located between the end of the sleeve member $c$ and the collar $d^2$ on the hook member $c'$, and fastened to such collar and the end of the arm respectively, causes the vibrating arm to be lengthened or shortened during its path of vibration conformably to the configuration of the said cam D. The extensible and contractible arms are mounted upon the upper ends of vertical shafts E E', extending through tubular supports E² E³, secured to the bed of the machine. Upon their lower ends the shafts bear segmental gears e e', which mesh with racks f f' upon arms F F', journaled upon studs projecting from the frame of the machine, as shown in Fig. 4. Each of these arms is made to vibrate independently of the other by cams G G' upon a continuously-revolving shaft, G².

In connection with the machine, and indispensable for its operation, is mechanism for applying to the heddles as they are formed metallic clasps to form the heddle-eyes. This mechanism is fully described in Letters Patent of the United States granted to me June 30, 1874, No. 152,465, to which reference may be had for a full description of the same.

It is also to be understood that the machine is to be furnished with spools or bobbins H H', carrying binding-threads, which spools revolve around the back-bands b b', and also with vertically-moving latch-needles J J', for crocheting the heddles to said bands. This mechanism is well known to the art.

Assuming, now, the machine to be in operation and the twine a to be conducted as shown in Fig. 1, it will be seen that the said twine passes through an eye, k, in the end of a sliding rod, K, and also is held by a notch, l, on a stationary finger, L. The vibrating arm C commences to move in the direction of the arrow, and as during its previous return movement it passed over that length of twine which lies between the notch l and eye k, it will in its present movement have its hooked end engaged with the twine, as shown in Fig. 1. At this moment the vibrating arm C' is moving in the direction of its arrow, and presently the relation of the two vibrating arms to each other will be as shown at Fig. 2, the said arm C' having within the time supposed moved to its farthest extent toward the front of the machine and commenced its return movement. In moving outward, or in the direction of the arrow shown in Fig. 1, its hooked end will ride over the short length of twine between the notch l and the eye k, and in making its return movement inward, or in the direction of the arrow shown in Fig. 2, its hooked end will be engaged with the twine, as shown in said figure. The vibrating arm C reaches its farthest extent of movement inward, and delivers the heddle-twine to the mechanism, which knits it to the back-band b before the fellow vibrating arm C' has reached its farthest extent of inward movement.

In Fig. 3 the same heddle-twine that is shown at Fig. 2 under the control of the vibrating arm C is shown as laid in a heddle and in position to be made fast to the back-band b, or, in other words, the point x on the twine a in Figs. 1 and 2 will be located at the back-band b, as shown in Fig. 3; and also in Fig. 3 the vibrating arm C is represented as returning toward its extreme outward position, which position is a little beyond that shown at Fig. 1. At or about the time that the vibrating arm C is in the position shown at Fig. 3 the arm C' has reached the farthest extent of its inward movement, as shown in said figure, has laid the twine under its control in a heddle and delivered it to the mechanism, which knits it to the back-band b'. From the foregoing it will be understood that the arm C' is a little later in its respective movements than the arm C. This arrangement is desirable in order that the hooked ends of the arms shall not interfere when they take the twine, and is also of advantage in that the slack which is produced in the twine as the arm C starts to move outward will be taken up by the finishing inward movement of the arm C'.

As heretofore stated, the vibrating arms C C' are extensible and contractible in length. This construction is important, for the reason that the arm is required to be longest when it engages with the twine preparatory to moving inward toward the back-bands, and also a peculiar movement in a rearward direction is required to be given to the twine when it passes the back-band to enable it to be delivered to and be taken by the latch-needle.

By observing the contour of the cams D it will be readily seen how the necessary changes in length are effected. That portion of the cam marked g operates to extend the hooked member c' to the proper length to engage the twine without unnecessary lost motion, while that portion of the cam marked g' is the means of giving an extension to the hooked end rearward of the back-band to enable the latch-needle to take the same.

Referring to Figs. 1 and 2, it will be observed that the guide-eye k in the end of the sliding rod K occupies a different position from that shown in Fig. 3. The movement of the rod K to the position shown in Fig. 3 is made at or about the time that the vibrating arm C' is completing its inward movement. This movement of the rod K from the position shown in Figs. 1 and 2 to that shown in Fig. 3 is to enable the twine to be carried over the notch l on the finger L, so that upon the return of the sliding rod to its original position there will be a length of twine between such notch l and the eye k in a position which will enable the extensible and contractible vibrators to engage with such twine. The movement of this sliding rod is effected by means of a rocking arm, M, (shown clearly at Figs. 1 and 4,) which arm is actuated by a cam, M', Figs. 4 and 5, through a rod or link, m, connecting such rocking arm with the cam, or by any other convenient means. When the vibrating arm C has moved inward far enough it will take the twine out of the notch l and lay it in a straight line from back-band to back-band.

The mechanism for putting the metallic clasps upon the heddle to form the heddle-eyes operates after both of the arms C C' have delivered the twine to the crocheting mechanism.

In machines of this general class take-up devices are employed in case the bobbin delivers the twine too freely by its momentum. In the drawings a convenient device for this purpose is illustrated, the same being shown most fully in Fig. 4.

The twine $a$ supports a ring, N, which serves merely as a weight. It is made in the form of a ring, so as to embrace two vertical guide-rods, O O', and allow it to have a free up-and-down movement, but be confined within small limits as to its sidewise movement. The twine passes from this weighted ring upward through two guide-eyes, P P', and between the two guide-eyes a light weight in the form of a rod, Q, is suspended on the twine.

A friction-brake, R, is pivoted to the frame of the machine at $r$, and is held in a balanced position, when not in action, by a weight, S, suspended from the brake by a wire and a counter-weight, R'. To the ring N an arm, $n$, is attached, which arm, by engagement with the weight S, when the ring descends sufficiently, enables said ring to bring the brake into action.

It is to be understood that when the twine is being delivered properly the ring N occupies a much higher position than is shown in the drawings, and the arm $n$ projecting therefrom is not in contact with the weight S. If, however, the bobbin by its momentum gives off too much twine, the weighted ring N will descend to a lower plane, and the arm $n$, the end of which is formed into an eye and surrounds the wire to which the weight S is attached, will come in contact with said weight S, as shown in the drawings, and thus a portion of the weight of the ring N being added to that of S will tilt the brake R and arrest the momentum of the bobbin. As the machine continues forming heddles the weight-ring N will presently be elevated to its normal position and relieve the bobbin of the brake.

What I claim as my invention, and desire to secure by Letters Patent, is—

1. The combination, substantially as before set forth, of the extensible and contractible vibrators, suitable means, as described, for reciprocating the same, and the fixed cams for varying the lengths of said vibrators.

2. The combination, substantially as before set forth, of a stand for supporting a twine-bobbin, devices, as described, for leading the twine to one of the back-bands of the harness, suitable means for supporting said back-bands, two oppositely-moving vibrators, arranged to engage the twine and return it upon itself to form two strands of the heddles, and simultaneously, or nearly so, to carry said strands to the back-bands, mechanism for fastening the heddles to the back-bands, and suitable means, as described, for actuating the operative devices.

3. The combination, as before set forth, of suitable means for supporting the back-bands of the harness, a device having a notch, $l$, for holding a portion of the length of twine that is to enter into the formation of the next ensuing heddle, a movable guide-eye, $k$, the hooked vibrators, adapted to engage with the length of twine between such notched device and the guide-eye, and carry the twine returned upon itself to the back-bands, mechanism for fastening the twine to the back-bands, and suitable means, as described, for actuating the operative devices.

JOHN H. CROWELL.

Witnesses:
W. H. THURSTON,
I. KNIGHT.